A. STARK.
Wheel Cultivator.

No. 58,147.  Patented Sept. 18, 1866.

Witnesses:  Inventor:

UNITED STATES PATENT OFFICE.

ANDREW STARK, OF TOPEKA, KANSAS.

IMPROVEMENT IN CULTIVATORS.

Specification forming part of Letters Patent No. 58,147, dated September 18, 1866.

*To all whom it may concern:*

Be it known that I, ANDREW STARK, of Topeka, in the county of Shawnee and State of Kansas, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
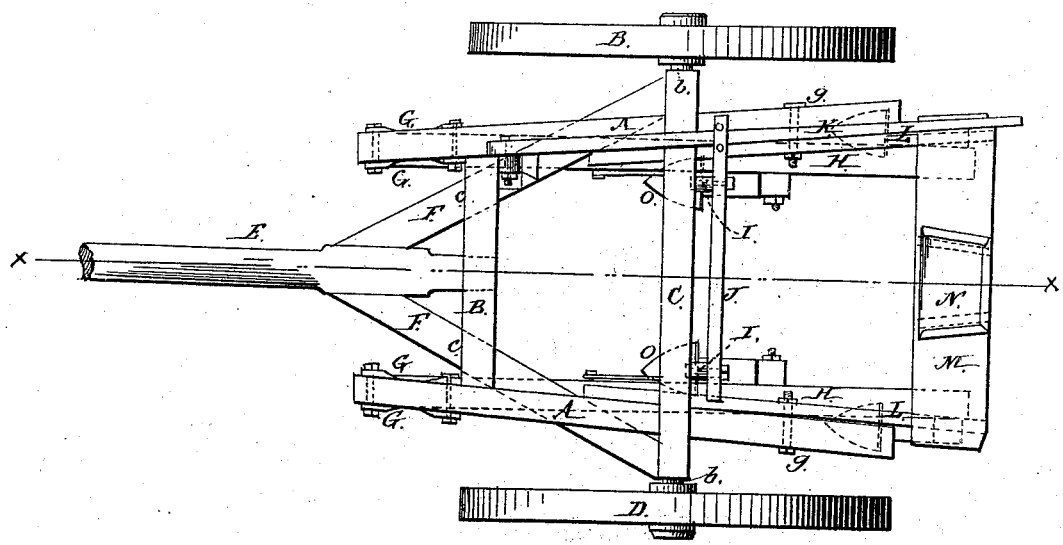
Figure 2:
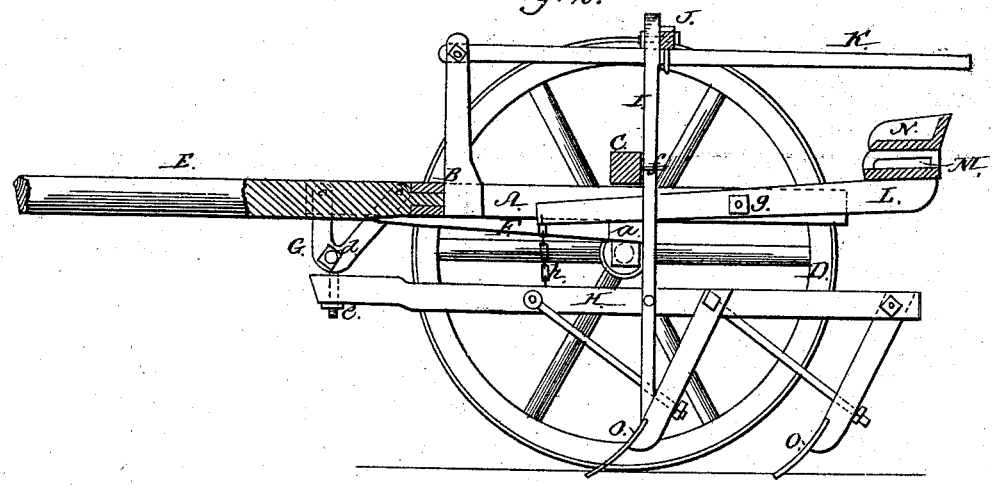

Figure 1 is a plan or top view of my invention; Fig. 2, a side sectional view of the same, taken in the line *x x*, Fig. 1.

Similar letters of reference indicate corresponding parts.

This invention relates to a new and improved cultivator for cultivating those crops which are grown in hills or drills; and it consists in a novel arrangement of a seat-frame with the plow-beams of the device, as hereinafter fully shown and described, whereby the plows are placed under the complete control of the driver.

The invention also consists in a novel manner of constructing and arranging the frame of the device and the draft-pole, as hereinafter set forth, whereby a very simple, strong, and durable device is obtained.

The frame of the machine is constructed as follows: A A are two bars, which are connected near their front ends by a cross-bar, B, and are also connected about at their center by the axle C, the ends of which have pendants *a a* attached, from which arms *b* project, the wheels D being fitted on said arms.

E is the draft-pole of the machine, the rear end of which is framed into the bar B, and is braced by two oblique bars, F F, which extend back and are framed into the pendants *a a*, shoulders *c* on the bars F abutting against the cross-bar B.

By this arrangement the draft-pole and frame are securely braced and the machine rendered extremely stiff and firm.

To the front end of each bar A there are attached two curved pendent bars, G G, through the lower ends of which horizontal pins *d* pass, on which eyebolts *e* are fitted loosely. These eyebolts pass vertically through the front ends of the plow-beams H, the latter being allowed to turn freely on the bolts in a lateral direction. The plow-beams, therefore, it will be seen, are rendered capable of being raised and lowered, and also of being moved laterally.

Each plow-beam has an upright bar, I, attached to it, and these bars pass through guides *f* at the rear of the axle C, and are connected at their upper ends by a bar, J, to one end of which a lever, K, is attached for moving or working the bars I I laterally.

L L are two bars, which are attached, one to each bar A of the frame, by a pivot-bolt, *g*. The front ends of these bars L L are connected by chains *h* to the plow-beams H H, and to the rear ends of the bars L L a bar, M, is secured, having the driver's seat N upon it. The feet of the driver rest or bear upon the plow-beams H H, and it will be seen that the plows O, which may be attached to the beams H in the usual manner, are balanced or counterpoised by the weight of the driver, who, by relieving the beams H of the pressure of his feet, may cause the plow-beams to rise at any time under his weight.

The lever K is within convenient reach of the driver on his seat, so that he may move the plows laterally at any time, in order to make them conform to the sinuosities of the rows of plants.

Having thus described my invention, I claim as new and desire to secure by Letters Patent—

The pivoted bars L L, having the driver's seat N attached to them, in combination with the plow-beams H H, connected at their front ends to the front part of the frame of the machine, and the plow-beams and bars connected by chains *h*, or their equivalents, substantially as and for the purpose specified.

ANDREW STARK.

Witnesses:
 B. B. FOWLER,
 JOHN S. BROWN.